US012101286B2

(12) United States Patent
Li et al.

(10) Patent No.: US 12,101,286 B2
(45) Date of Patent: Sep. 24, 2024

(54) METHOD FOR PROVIDING LOCATION-BASED CONTENT-LINKING ICON, SYSTEM FOR THE SAME, AND COMPUTER-READABLE RECORDING MEDIUM

(71) Applicant: Framy Inc., Grand Cayman (KY)

(72) Inventors: Yu-Hsien Li, Taipei (TW); Yu-Chih Lee, New Taipei (TW); Shi-Ting Li, Taipei (TW)

(73) Assignee: Framy Inc., Grand Cayman (KY)

(*) Notice: Subject to any disclaimer, the term of this patent is extended or adjusted under 35 U.S.C. 154(b) by 0 days.

(21) Appl. No.: 18/299,061

(22) Filed: Apr. 12, 2023

(65) Prior Publication Data

US 2023/0336513 A1 Oct. 19, 2023

(30) Foreign Application Priority Data

Apr. 18, 2022 (TW) .................................. 111114572

(51) Int. Cl.
*H04L 51/52* (2022.01)
*H04L 51/216* (2022.01)

(52) U.S. Cl.
CPC ............ *H04L 51/216* (2022.05); *H04L 51/52* (2022.05)

(58) Field of Classification Search
None
See application file for complete search history.

(56) References Cited

U.S. PATENT DOCUMENTS

| 2015/0334077 | A1  | 11/2015 | Feldman |
| 2018/0315134 | A1* | 11/2018 | Amitay ................. H04L 51/222 |
| 2021/0200425 | A1* | 7/2021  | Al Majid ........... H04M 1/72469 |
| 2021/0319475 | A1* | 10/2021 | Li .......................... G06F 3/0481 |
| 2022/0019337 | A1  | 1/2022  | Natali, Jr. et al. |
| 2022/0324640 | A1* | 10/2022 | Gravitt .................. B65F 1/1484 |

FOREIGN PATENT DOCUMENTS

| CN | 112836136 A    |   | 5/2021 |
| CN | 113392272 A    |   | 9/2021 |
| KR | 20140113162 A  | * | 3/2013 |
| TW | 202209088 A    |   | 3/2022 |

* cited by examiner

*Primary Examiner* — Natisha D Cox
(74) *Attorney, Agent, or Firm* — Li & Cai Intellectual Property Office

(57) ABSTRACT

A method and a system for providing a location-based content-linking icon based on a discussion content category, and a computer-readable recording medium are provided. The system includes a server having a database and a linking-icon library. When the server receives location data from a user device, a geographic range can be determined. After querying the database according to the geographic range, one or more location-based contents correlated with a geographic location within the geographic range can be obtained. Afterwards, the linking-icon library is queried for obtaining the location-based content-linking icon that is used to be marked at the geographic location on a graphical user interface according to the category of the one or more location-based contents. The location-based content-linking icon is dynamically updated when the category of the one or more location-based contents is changed.

13 Claims, 7 Drawing Sheets

METHOD FOR PROVIDING LOCATION-BASED CONTENT-LINKING ICON, SYSTEM FOR THE SAME, AND COMPUTER-READABLE RECORDING MEDIUM

CROSS-REFERENCE TO RELATED PATENT APPLICATION

This application claims the benefit of priority to Taiwan Patent Application No. 111114572, filed on Apr. 18, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system that is used to provide location-based contents, and more particularly to a method and a system for providing location-based content-linking icons on an electronic map according to categories of the contents, and a non-transitory computer-readable recording medium.

BACKGROUND OF THE DISCLOSURE

Currently, the Internet has become a major source from which a user can acquire information. Many search engines are also provided on the Internet to allow the user to easily look up information by using keywords. When a user wants to search for answers on a specific topic or discuss the specific topic with other users, the user can further create a discussion topic on a network forum. The network forum allows other users that are interested in the discussion topic to join the discussion, so that the user who created the discussion topic can obtain opinions from various respondents.

In a conventional network forum or a conventional service that hosts these discussions based on the categories of the topics, the discussions are generally shown on a text-based user interface. The topics are usually fixed on what was proposed by the user, and the discussions are generally simple and lack in diversity. Further, the discussion topics in the conventional network forum are generally not geographically-related topics, i.e., the discussion topics are not localized based on a location of the user. Therefore, the conventional services can fail to recommend to users any topic that is relevant to a location of interest and that matches with the interest of the user. Furthermore, the user can only use keywords to search the network forum, without a more direct access to any location-related discussion topics.

SUMMARY OF THE DISCLOSURE

In response to the above-referenced technical inadequacies (for which conventional discussion topics in certain web pages lack attributes of locations), the present disclosure provides a method and a system for providing a location-based content-linking icon based on a type of the content, and a computer-readable recording medium. The system can rely on location information to provide location-related contents, such as discussion topics, audiovisual contents and live videos. That is, the contents searched or established in the system for providing the location-based content-linking icon are generally related to geographic locations, and can also be contents that match a personal preference. Further, a graphical user interface is provided to show a map interface, and linking icons are marked on the map interface. The method can also provide one or more location-based content-linking icons based on categories of the contents.

According to an aspect of the present disclosure, in the system for providing the location-based content-linking icon, a server having a database (such as a discussion-topic database) and a linking-icon library is provided. The system provides a software program executed in a user device. A user can initiate the graphical user interface by the software program.

In the method for providing the location-based content-linking icon, the database is queried according to coordinates of a geographic range generated via the graphical user interface, so as to obtain one or more location-based contents that match the personal preference and are correlated with at least one geographic location within the geographic range. Next, the linking-icon library is queried according to a category of each of the location-based contents at each of the geographic locations, so as to obtain the one or more location-based content-linking icons marked at the at least one geographic location on the graphical user interface. The one or more location-based content-linking icons are then transmitted to the user device, so as to be marked on the graphical user interface initiated in the user device.

Further, when the category of any of the location-based contents that match the personal preference is changed, the linking-icon library is queried again for refreshing the location-based content-linking icon marked on the corresponding geographic location.

Preferably, the location-based content can be a location-based discussion topic, a location-based audiovisual content, or a location-based live content. Thus, the graphical user interface can be the map interface initiated by the software program executed in the user device. The one or more location-based content-linking icons can be marked on the map interface. The location-based content-linking icon is used to link the one or more location-based discussion topics, so as to form a topic-discussion page.

Further, on the topic-discussion page, the contents of the discussion topics can be displayed in different directions. For example, one or more topic-discussion areas formed by the one or more location-based discussion topics are displayed in a first direction. The topic-discussion areas can be sorted by popularity. One or more location-based discussion-topic categories can be displayed in a second direction according to the personal preference.

Still further, when the discussion-topic database is queried, the personal preference can be used to screen out the one or more location-based discussion topics that match the personal preference and are correlated with the at least one geographic location within the geographic range.

In one further aspect of the present disclosure, a non-transitory computer-readable recording medium is provided for storing computer instructions that are performed in the user device to connect with the server of the system, to load contents from the server, and to initiate the graphical user interface. When the graphical user interface is initiated in the user device, location data is generated and transmitted to the server. In the server, the geographic range is determined according to the location data, and the one or more location-based content-linking icons are obtained by querying the database. The one or more location-based content-linking icons are transmitted to the user device, and can be marked at the at least one geographic location on the graphical user interface.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
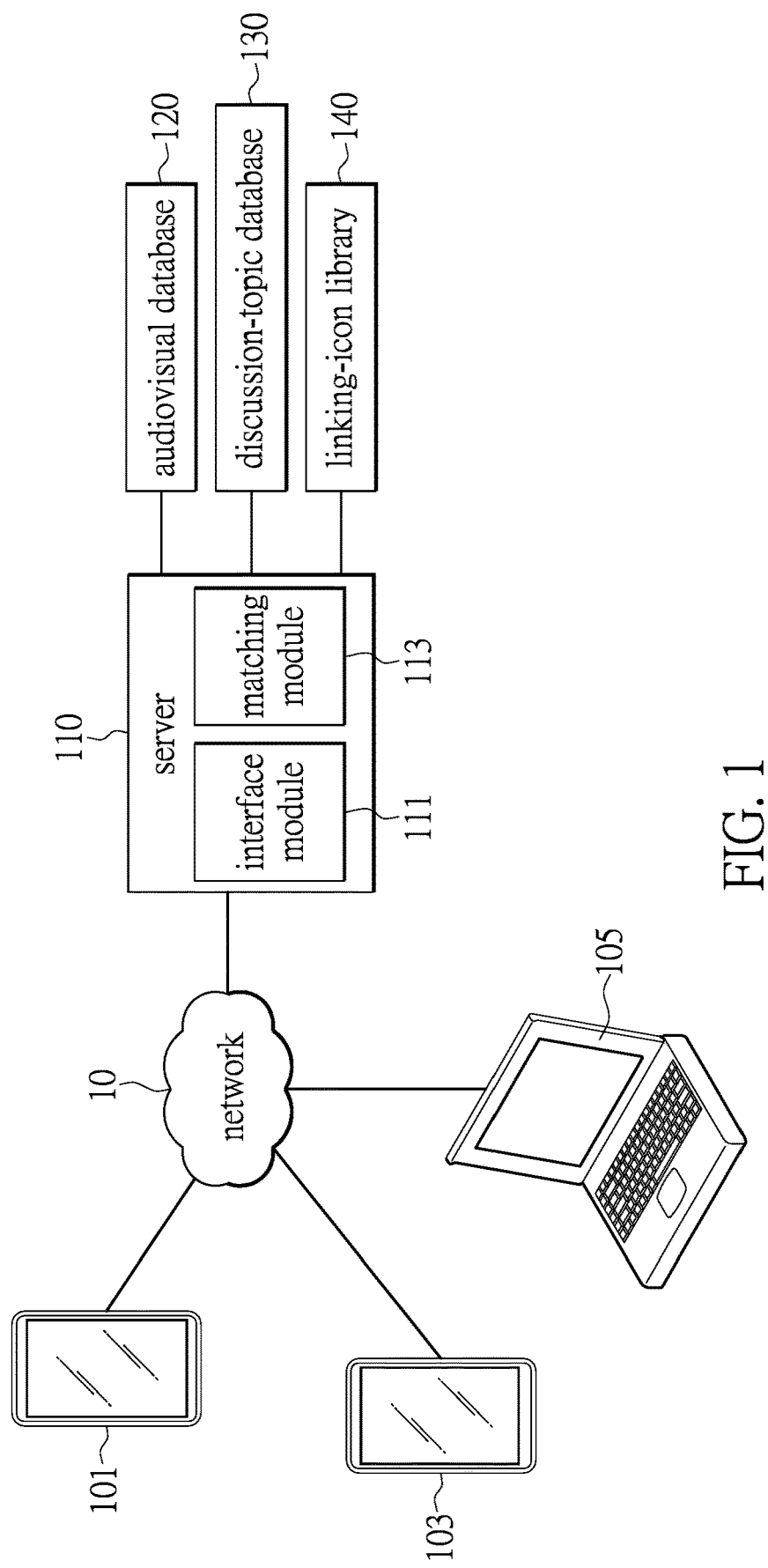
FIG. 1 is a schematic diagram depicting a framework of a system for providing a location-based content-linking icon according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure provides a method and a system for providing a location-based content-linking icon, and a non-transitory computer-readable recording medium. The system allows users to select location-related contents via a graphical user interface. The contents can be discussion topics, audiovisual contents, and live videos. When the user browses the contents at different areas, countries and cities, the contents related with geographic locations can also be obtained. The system also allows the user to create location-based contents. Further, the system provides a software program executed in a user device for the user to browse the contents via the graphical user interface. The user can use a mobile phone, a tablet computer, or a personal computer to conveniently browse one or more location-based content-linking icons shown on the graphical user interface. By clicking the location-based content-linking icon, the user can access various types of the location-based contents, which also include the location-based contents that the system recommends to the user.

Preferably, the user device initiates a map interface on the graphical user interface and marks the location-based content-linking icons at different geographic locations on the map interface. The location-based content-linking icon represents a category of the linked contents and allows the user to quickly identify the category of the contents correlated with the content-linking icon marked at the geographic location. Further, when the category of the contents correlated with the geographic location is changed, the location-based content-linking icon will be refreshed synchronously.

According to the embodiment of the system for providing the location-based content-linking icon, the system is configured to provide the location-based contents. Reference is made to FIG. 1, which is a schematic diagram of a framework of the system according to one embodiment of the present disclosure. The system is operated by a server 110 in order to provide the location-based contents. One of the main functions of the server 110 is to provide an interface module 111 that is used to provide the contents to user devices 101, 103, and 105. In the user devices 101, 103, and 105, a webpage or a specific software program is executed to initiate a user interface for displaying the location-based content-linking icons and the corresponding location-based contents. One further function of the server 110 is to provide a matching module 113 for matching the contents in a database of the server 110 according to location data generated by these user devices. The contents are, for example, discussion topics, audiovisual contents, and/or live videos. The matching module 113 allows the server 110 to, based on the user information (e.g., a user ID) provided by the user device, match the contents that are consistent with the user's personal preference to the user device. Furthermore, the server 110 is able to provide the location-based content-linking icons corresponding to the categories of the contents to the user device.

The server 110 can implement databases having a variety of contents by a database technology. In one embodiment of the present disclosure, the databases are, for example, an audiovisual database 120, a discussion-topic database 130, and a linking-icon library 140. The databases are used to record the location-based contents that are correlated with every location. For example, the discussion-topic database 130 records the location-based discussion topics correlated with the locations, and the linking-icon library 140 records the one or more location-based content-linking icons that correspond to categories of the various contents. In one embodiment of the present disclosure, when the server 110 receives the location data from any of the user devices 101, 103, and 105 via a network 10, a software sequence running in the user device is configured to query the database according to the location data, so as to obtain one or more location-based contents within a geographic range. For example, the discussion-topic database 130 is used to obtain the discussion topics. The categories of the location-based contents can be analyzed by looking up a lookup table or using a semantic artificial intelligence technology. The linking-icon library 140 is then queried so as to obtain one or more location-based content-linking icons that are transmitted to the user devices 101, 103, and 105. Afterwards, the one or more location-based content-linking icons can be marked on the graphical user interface initiated in the user device 101, 103, or 105.

In addition to provision of the location-based contents, after the server 110 receives the location data from the user devices 101, 103, and 105, the audiovisual database 120 can be queried according to the location data for obtaining one or more location-based audiovisual contents within the geographic range. Similarly, one or more corresponding audiovisual content-linking icons are provided to the user devices 101, 103, and 105. Thus, the user device initiates a software-implemented user interface that can be an electronic-map-based graphical user interface. One or more location-related discussion-topic-category linking icons and one or more location-related audiovisual content-linking icons can be marked on the user interface at the same time. Therefore, the services of providing the location-based contents (such as the discussion topics and audiovisual contents) are implemented. The system also allows the user to arbitrarily adjust the geographic range for browsing the various contents therein. In the meantime, the server 110 can transmit the corresponding linking icons to be marked on the user interface to the user device.

The software programs running in the server 110 can record behaviors of the user (e.g., commenting, liking, following, and sharing a specific discussion topic) by an algorithm. The algorithm can also calculate an area of interest (e.g., a city, a country, a scenic spot, and a landmark) of the user and the discussion topics that the user is interested in. The users of the server 110 can be grouped, so that the discussion topics that are of interest to the user and within the area of interest can be effectively recommended to the user. Further, popular topics in the area of interest for each of the groups can also be calculated.

Through the system for providing the location-based content-linking icons, the user can browse the location-based contents on the map interface via a specific software program. The location-based contents are, for example, the location-based audiovisual contents and the location-based discussion topics. In addition to determining the categories of the location-based audiovisual contents from thumbnail icons of the audiovisual contents, the system allows the user to quickly learn the categories of the contents from the location-based content-linking icons. Further, when any of the categories of the location-based contents is changed (such as the change made to the location-based contents that are recommended by the system according to the personal preference of the user), the location-based content-linking icons marked on the map interface are dynamically and synchronously refreshed.

Figure 2:
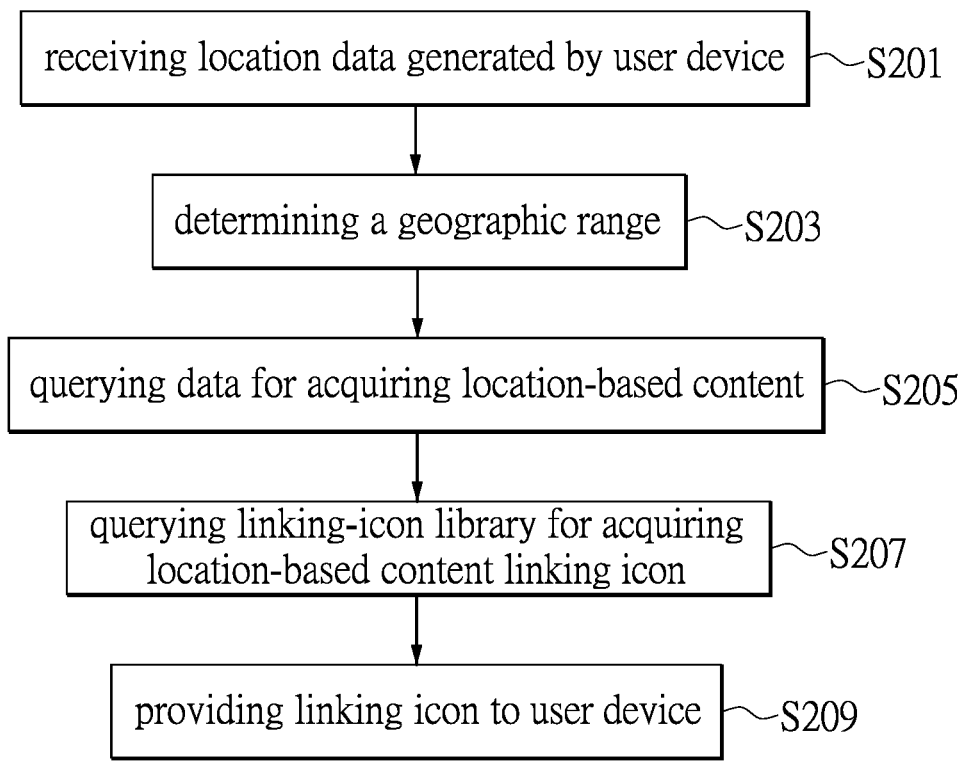
FIG. 2 is a flowchart illustrating a method for providing the location-based content-linking icon according to one embodiment of the present disclosure.

FIG. 2 is a flowchart illustrating the method for providing the location-based content-linking icon according to one embodiment of the present disclosure. Before the method is operated, the user device executes a software program provided by the system. The software program is preferably a social media program that is stored in the non-transitory computer-readable recording medium of the user device. The non-transitory computer-readable recording medium stores computer instructions that are executed to connect with the server of the system for providing the location-based content-linking icon, load contents from the server, and initiate the graphical user interface.

The system provides the location-based contents to the user device via the software program. The graphical user interface initiated by the software program is a map interface, by which the user device generates relevant location data that can be coordinates of a central location of an area shown on the map interface. The location data is transmitted to the server when the user manipulates the map interface. As such, the server receives the location data generated by the user device (step S201). The server determines the geographic range where the user is browsing according to the location data (step S203). It should be noted that the geographic range is determined based on a screen size and a resolution of a display of the user device. Accordingly, a software sequence operated in the server can determine the geographic range according to the location data and display information transmitted from the user device.

Figure 5:
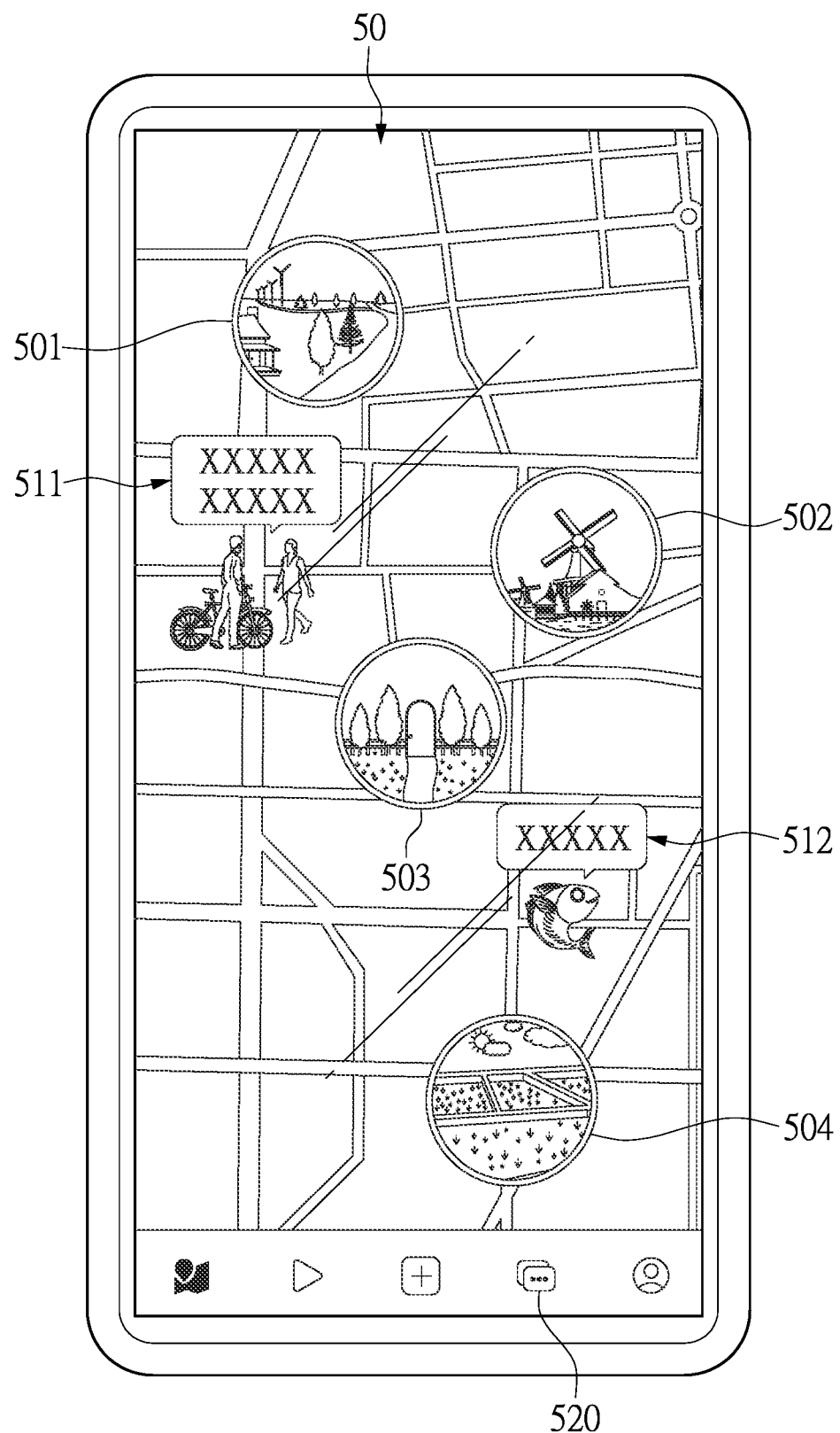
FIG. 5 is a schematic diagram depicting a graphical user interface having a plurality of location-based topic linking icons according to one embodiment of the present disclosure.

In the server, the database is queried according to coordinates of the geographic range, so as to obtain one or more location-based contents at the at least one geographic location within the geographic range (step S205). Next, the location-based content-linking icons corresponding to the location-based contents can also be obtained by querying the database based on the location-based contents obtained at the previous step (step S207). Afterwards, the one or more location-based content-linking icons are provided to the user device (step S209), and the one or more location-based content-linking icons can be marked on the graphical user interface initiated by the user device based on their geographic locations. Reference can be made to FIG. 5, which shows that the location-based content can be the discussion topic. When the user device displays the electronic-map-based graphical user interface, multiple location-based topic linking icons 511 and 512 are marked thereon.

It should be noted that, there is the possibility that no content correlated with any geographic location is present within the geographic range determined according to the location data generated by the user device. Alternatively, contents correlated with one or more geographic locations can be found, or each of the geographic locations can be correlated with more than one content. More particularly, when determining the location-based content-linking icon to be marked at a specific geographic location on the graphical user interface, the category of the one or more location-based contents correlated with the geographic location is required to be obtained in advance. For example, a title of the discussion topic and its content indicate the category of the discussion content. If the content category corresponds to more than one location-based content-linking icon, the system can decide one of the location-based content-linking icons to be marked on the graphical user interface in a random manner or based on a specific order. For example, if the title of the discussion topic shows that there are fishing related topics at the geographic location, the location-based content-linking icon can be a fish for indicating that the linked contents are fish-related contents. The fish-related contents can be the fish-related discussion topics, audiovisual contents, or live videos. The relevant content category can be leisure or cooking. Similarly, if the content category relates to sports, traveling, 3C electronics (i.e., computer, communication and consumer electronics), or photography, the corresponding location-based content-linking icon can be a bicycle, a recreational facility, a computer device, or a camera.

Figure 3:
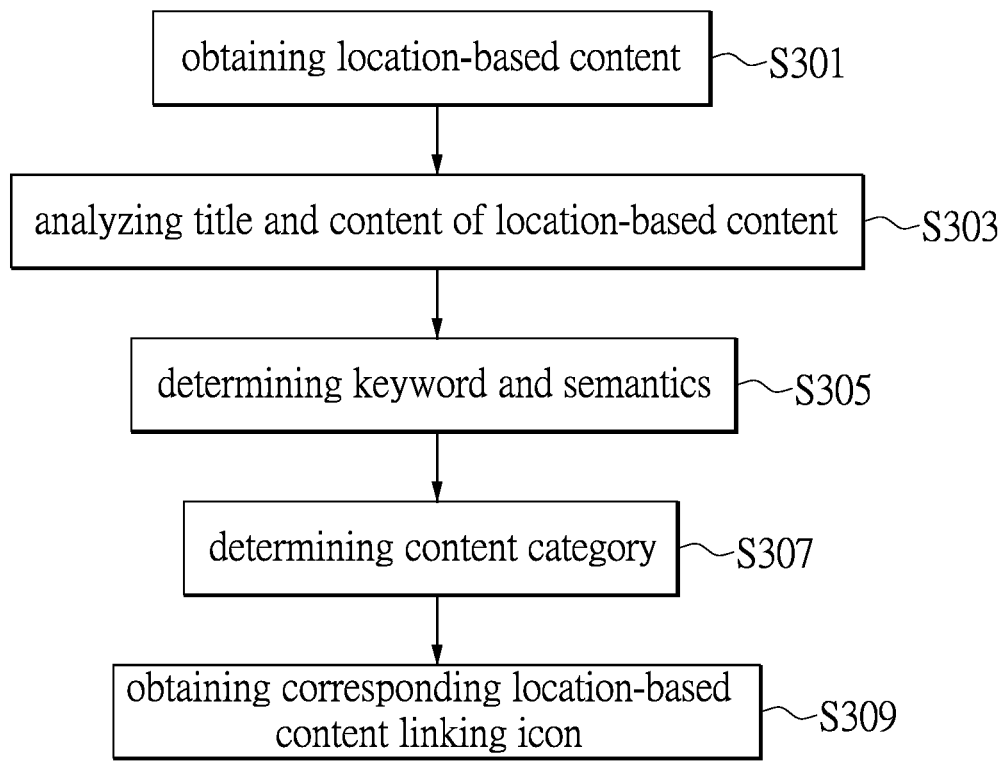
FIG. 3 is a flowchart illustrating a process of determining a discussion content category in the method for providing the location-based content-linking icon according to one embodiment of the present disclosure.

Reference is made to FIG. 3, which is a flowchart illustrating a process of determining a category of a location-based content that is correlated with a geographic location according to one embodiment of the present disclosure.

In the method of the present embodiment, a specific linking icon is determined to be marked on the graphical user interface according to the category of the location-based content. The category is determined by a process of determining the content category. In the process, a software sequence operated in the server firstly obtains the location-based contents corresponding to the geographic locations (step S301). A title and details of each of the contents can be analyzed (step S303). In an exemplary example, a semantic analysis technology is used to analyze texts in the content and further analyze pictures and videos (e.g., titles and contents of the discussion topics, the audiovisual contents, and the live videos) in the content. Therefore, one or more keywords and the semantics can be obtained (step S305).

According to the one or more keywords and semantics for each of the location-based contents, the lookup table that is established in advance by various keywords, semantics and the preset content categories is used to acquire the categories of the one or more location-based contents (step S307). In one further embodiment of the present disclosure, a model for determining the content category is established through the semantics that is learned by a machine learning method and the categories. Thus, a semantics-based artificial intelligence method is used to determine the content category of the location-based content. Next, the linking-icon library is referred to for obtaining a corresponding one of the location-based content-linking icons (step S309).

Afterwards, the server transmits the location-based content-linking icons to the user device, and the location-based content-linking icons can be marked on the graphical user interface. Similarly, as described above, the software sequence operated in the server can repeat the process shown in FIG. 3 according to the change of the geographic range due to manipulation of the user or according to the change of the category of the location-based content recommended by the system. The location-based content-linking icons can also be synchronously refreshed.

Taking the discussion topic as an example, reference is made to FIG. 5, which shows an exemplary example of the graphical user interface initiated by the user device. An electronic map 50 is shown on the user device, on which various linking icons are marked at different locations. For example, multiple audiovisual content-linking icons 501, 502, 503, and 504 and the discussion-topic linking icons 511 and 512 obtained by the processes of FIG. 2 and FIG. 3 are shown on the graphical user interface initiated in the user device. However, a quantity and configuration of these icons are not to be construed as limiting the embodiment of the present disclosure. More particularly, the electronic map 50 forms a map interface that allows the user to browse and click on the linking icons shown on the map interface. An annotation with respect to each of the one or more location-based contents is tagged at a side of the corresponding location-based content-linking icon. Each of the location-based topic linking icons is used to link one or more location-based discussion topics that are shown on a topic-discussion page.

A main page of the electronic map 50 shown in FIG. 5 shows various linking icons. Multiple function buttons that are used to assist the user in browsing the location-based contents are shown at a bottom of the main page. For example, the function buttons can be used to position a current location of the user, play all audiovisual contents on a page to be browsed, add a location-based audiovisual content, and maintain a profile of the user. Further, the main page may also provide one more function button that allows the user to add a new discussion topic, such as a discussion-topic button 520.

When the user browses the electronic-map-based graphical user interface, the audiovisual content-linking icons 501, 502, 503, and 504 and the discussion-topic linking icons 511 and 512 can be provided as the links to the location-based contents. In addition to correlating with the locations, the personal preference can be introduced as a reference to query a discussion-topic database, so as to acquire one or more location-based discussion topics that are correlated with at least one geographic location and match the personal preference.

Figure 4:
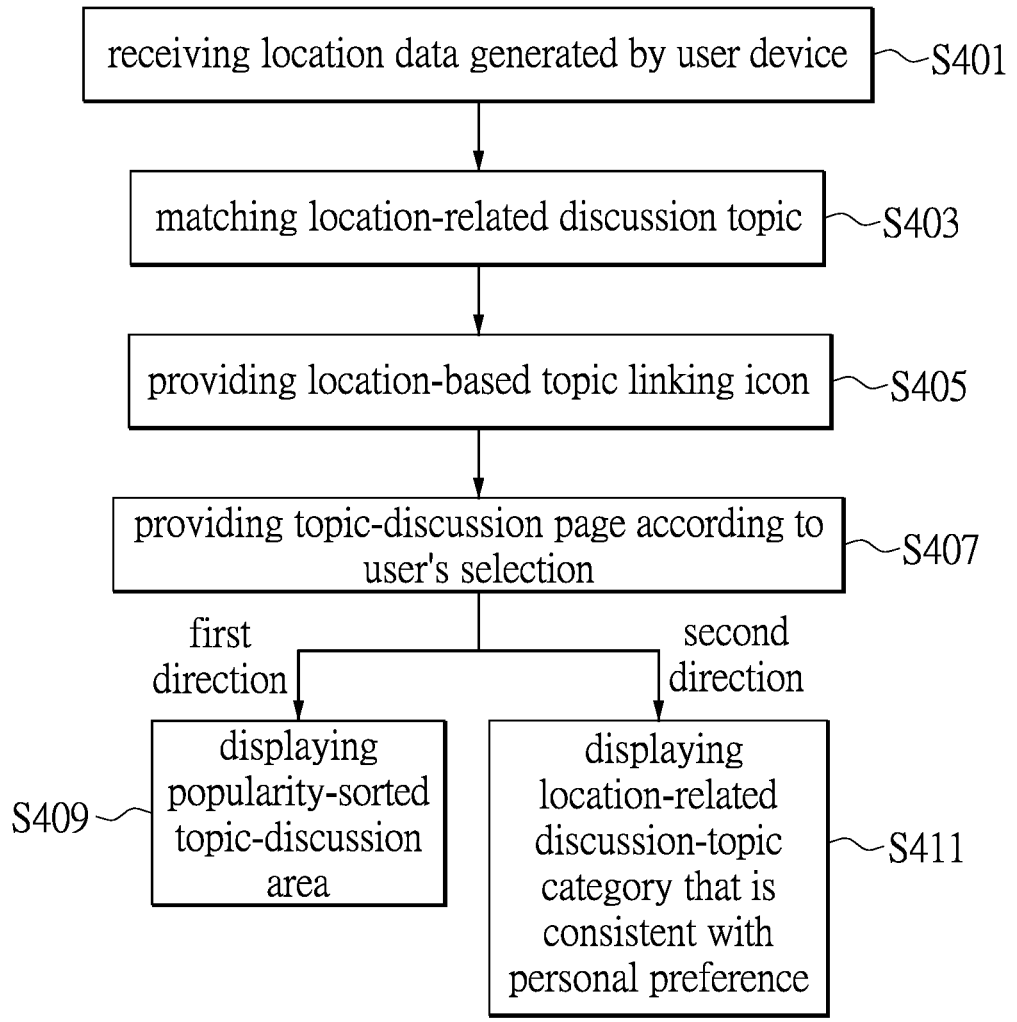
FIG. 4 is a flowchart illustrating a process of forming a topic-discussion page in the method for providing the location-based content-linking icon according to one embodiment of the present disclosure.
Figure 6:
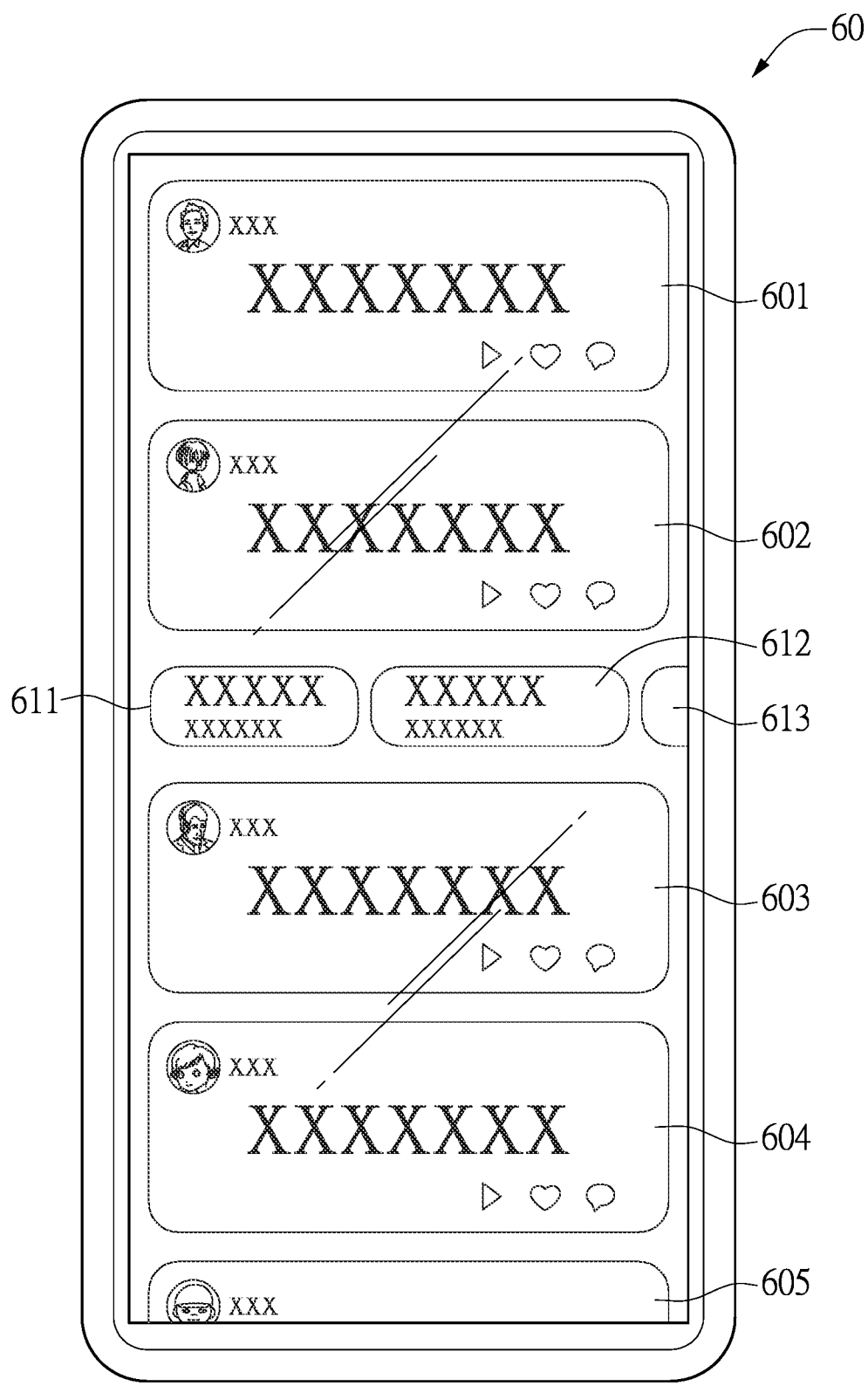
FIG. 6 is a schematic diagram depicting the topic-discussion page provided by the system according to one embodiment of the present disclosure.

When the user clicks on one of the location-based topic linking icons, the topic-discussion page having one or more location-based discussion topics is provided. Reference is made to FIG. 4, which is a flowchart illustrating a process of determining the contents in the topic-discussion page according to one embodiment of the present disclosure. FIG. 6 is a schematic diagram of the graphical user interface rendering the topic-discussion page according to one embodiment of the present disclosure.

The software program executed in the user device can be a social media program that allows the user device to enable entry into a front page and generate location data. The location data is then transmitted to the server (step S401). The location data can be the geographic range. For example, the graphical user interface is initiated on a touch-sensitive display of the user device. The user can perform a gesture to manipulate the graphical user interface, so as to browse the contents thereon. The graphical user interface can be zoomed in, zoomed out, and moved for formation of a display area. The geographic range is therefore generated. A matching module of the server can be used by means of software to query the discussion-topic database according to the location data, so as to match one or more location-related discussion topics within the geographic range and to acquire one or more location-based audiovisual contents within the geographic range (step S403). In the meantime, the corresponding one or more location-related discussion-topic linking icons are obtained. The location-related discussion-topic linking icons, accompanied with the audiovisual content-linking icons that are obtained at the same time, can be provided to the user device over a network (step S405).

It should be noted that the location-related discussion topic can be created by many users of the server. For example, the discussion topic can be a location-related topic, and the location-related audiovisual contents can be transmitted to the server by many users via the network. The location-related audiovisual contents can be images of scenic spots or landmarks, or can be images related to the location.

The user can use the graphical user interface to browse one or more location-based discussion topics and/or audiovisual contents within the geographic range. When one of the links of the location-related discussion topics is selected, the server provides the topic-discussion page according to the selected location-related discussion topic. The contents shown on the topic-discussion page are the contents related to the selected location-related discussion topic. FIG. 6 shows an exemplary example, in which topic-discussion areas sorted by popularity are displayed in a first direction, and location-based discussion-topic categories that match the personal preference are displayed in a second direction (step S407).

FIG. 6 shows an exemplary example of the topic-discussion page according to one embodiment of the present disclosure. A topic-discussion page 60 shown on the graphical user interface is initiated in a mobile device. The above-mentioned first direction can be a vertical direction of the diagram, and the second direction can be a horizontal direction of the diagram. Multiple topic-discussion areas 601, 602, 603, 604, and 605 are shown along the vertical direction of the diagram. Several squares that indicate discussion-topic categories 611, 612, and 613 are provided in a horizontal area between the topic-discussion area 602 and the topic-discussion area 603. For any of the topic-discussion areas 601, 602, 603, 604, and 605 or the discussion-topic categories 611, 612, and 613, the system allows the user to like, follow, or share discussion topics that the user has joined through the various buttons.

In one further embodiment of the present disclosure, the topic-discussion areas 601, 602, 603, 604, and 605 that can be sorted by popularity are displayed in the first direction. The topic-discussion areas 601, 602, 603, 604, and 605 displayed in the first direction are provided for the user to browse the popularity-sorted topic-discussion areas with a vertical swipe gesture (step S409). The discussion-topic categories 611, 612, and 613 displayed in the second direction can be the categories of the one or more location-related discussion topics that match the personal preference. The discussion-topic categories 611, 612, and 613 in the second direction are provided for the user to browse the categories of the discussion topics with a horizontal swipe gesture (step S411).

Further, after the server matches the discussion topic from the discussion-topic database, the topic-discussion areas 601, 602, 603, 604, and 605 are shown in the first direction. When the user performs the vertical swipe gesture to browse the contents in the vertical direction, even when the contents in the original geographic range are exhausted, the system can continue to provide the topic-discussion areas within geographic ranges other than the location originally selected by the user.

It should be noted that, according to the above embodiments, the location-related topic discussion system provides multiple topic-discussion areas being sorted in the first direction. The topic-discussion areas are sorted according to the popularity of the discussion topics. One way of calculating the popularity is based on timeliness, likes, and/or the personal preference of the user for each of the discussion topics, such that the overall popularity of each of the discussion topics can be obtained. For example, according to one exemplary example of an algorithm operated in the location-related topic discussion system, the preference for a specific discussion topic can be determined based on a quantity of likes, shares, comments, and/or following of the discussion topic. The scenarios that the server relies on to determine the preference for the specific discussion topic include the user following the discussion topic but not giving any comment or likes, and a number of times that the discussion topic is seen by all the users. Furthermore, when determining the number of times that the discussion topic is seen by all the users, periods of time can also be considered. For example, the user is determined to be following the discussion topic only if the user sees said discussion topic for a certain period of time, e.g., seven seconds.

The personal preference of the user is determined based on comments made by the user, a staying time, and personal interests (such as the acts of likes, shares, comments, and/or following). Accordingly, the personal preference of the user can be established and used for matching the discussion topics that are consistent with the personal preference.

Similarly, the user can perform the horizontal swipe gesture to browse the discussion-topic categories 611, 612 and 613 in the second direction. The server can continuously provide the location-related discussion-topic categories according to the personal preference. If the contents have been exhausted, through determination made by a software means, the contents provided by the server can be expanded outward to other geographic ranges from the location linked to the original location-related discussion topic. In this way, the location-related discussion-topic categories can be continuously provided. In one further embodiment of the present disclosure, when running out of the location-related discussion-topic categories provided by the server, the system can actively switch to another discussion-topic category.

Figure 7:
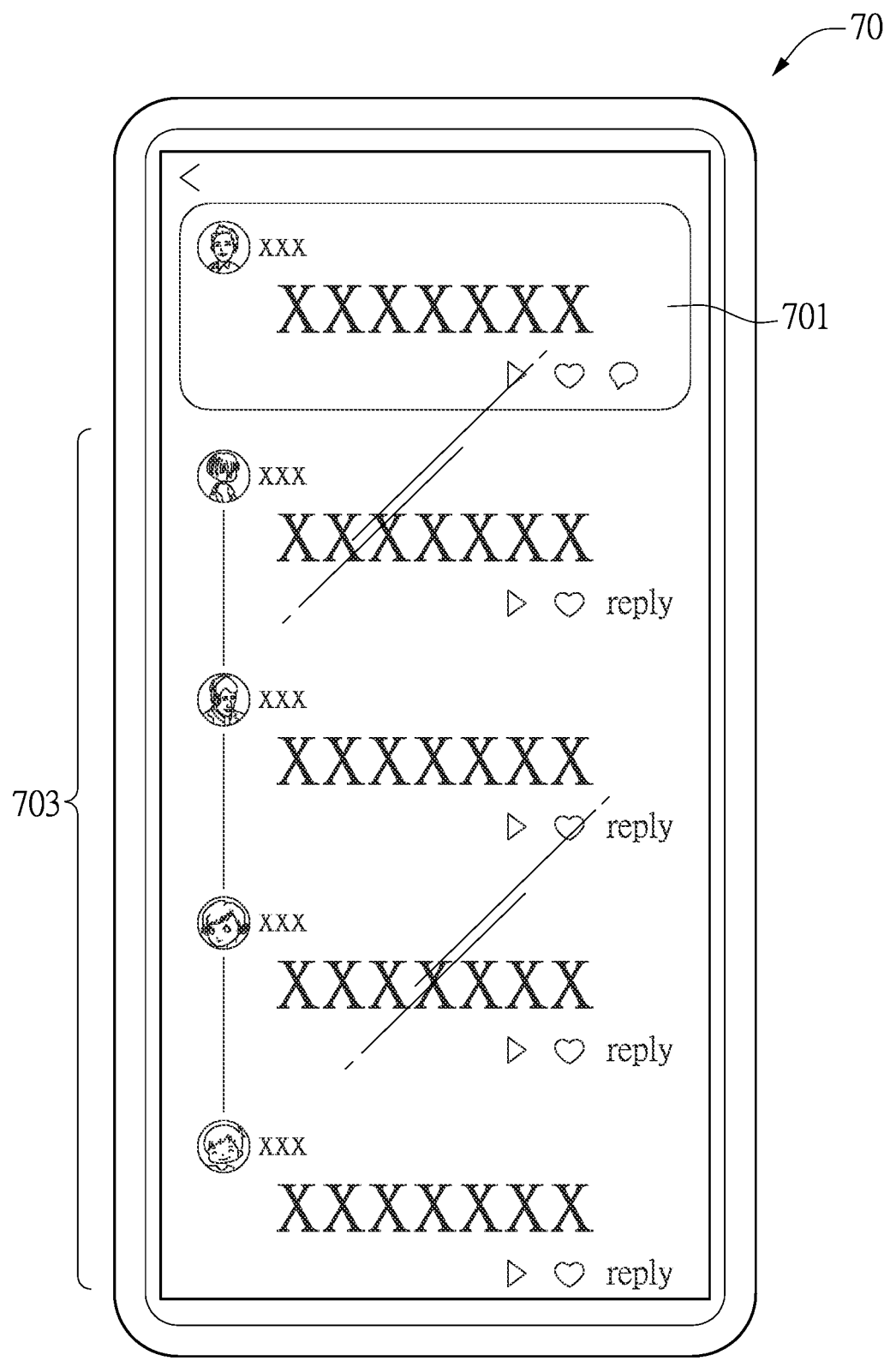
FIG. 7 is a schematic diagram depicting a discussion-topic dialogue page according to one embodiment of the present disclosure.

Afterwards, when the user uses the touch-sensitive display of the user device or other input method to select one of the topic-discussion areas in the first direction on the topic-discussion page, the server provides the contents of the selected discussion topic. Reference is made to FIG. 7, which is a schematic diagram depicting a discussion-topic dialogue page provided by the system according to one embodiment of the present disclosure. When the server receives the selection of one of the topic-discussion areas in the first direction from the user device, the server provides the discussion content of the selected topic-discussion area on a discussion-topic dialogue page 70 by querying the discussion-topic database. The present example shows one or more discussion topics 701 and discussion contents 703 on the discussion-topic dialogue page 70.

On the other hand, when the user uses the touch-sensitive display or other input method to select one of the discussion-topic categories in the second direction on the topic-discussion page, the server receives the selection of the discussion-topic category from the user device, and another topic-discussion page is provided by querying the discussion-topic database (step S411).

In should be noted that the software processes operated in the server illustrated in FIG. 2 and FIG. 3 and the software process operated in the user device illustrated in FIG. 4 are collaborated as the computer instructions executed in the user device. The computer instructions are stored to the non-transitory computer-readable recording medium, and are performed to connect with the server of the system, to load contents from the server, and to initiate the graphical user interface. Accordingly, the server can provide the various location-based contents (such as the audiovisual contents and the discussion topics) to the user device. Regarding the relevant graphical user interfaces, reference can be made to the schematic diagrams shown in FIG. 5 to FIG. 7.

The computer instructions can be implemented by the social media program. In one embodiment of the present disclosure, an electronic-map-based social media program is executed in the user device, or a social media webpage provided by the server is initiated in the user device. The graphical user interface is initiated in the user device for enabling entry into the front page. The map interface is provided for the user to conduct browsing and selection by various input methods. When any of the location-based topic linking icons is selected, the topic-discussion page is entered. Through the computer instructions executed in the user device, the user can perform the vertical swipe gesture in the first direction for browsing the one or more popularity-sorted topic-discussion areas on the graphical user interface, and perform the horizontal swipe gesture in the second direction for browsing the multiple discussion-topic categories.

In conclusion, in the method and the system for providing the location-based content-linking icon, and the non-transitory computer-readable recording medium in the user device for initiating the graphical user interface, the system provides databases (such as a discussion-topic database and a linking-icon library) that can be queried for obtaining the location-based contents according to the location data provided by the user device. In addition, the location-based content-linking icons marked on the graphical user interface can be obtained according to the categories of the location-based contents. In response to changes of the contents, the location-based content-linking icons can be dynamically refreshed. Therefore, the users can easily determine the categories of the contents linked to the geographic locations on a map.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for providing a location-based content-linking icon, which is adapted to a server, the method comprising:
   querying, according to coordinates of a geographic range generated via a graphical user interface, a database to obtain one or more location-based contents that match a personal preference and are correlated with at least one geographic location within the geographic range;
   querying, according to a content category of each of the location-based contents, a linking-icon library that records one or more location-based content-linking icons corresponding one or more content categories to obtain the one or more location-based content-linking icons that are configured to be marked at the at least one geographic location on the graphical user interface; and
   entering a topic-discussion page in response to clicking on any of the one or more location-based content-linking icons that are configured to link to one or more location-based discussion topics; wherein, on the topic-discussion page, multiple topic-discussion areas formed from the one or more location-based discussion topics are displayed in a first direction and sorted by popularity, and multiple location-related discussion-topic categories that match the personal preference are displayed in a second direction;
   wherein the one or more location-based contents obtained from the database are categorized into one or more content categories; when the content category of any of the location-based contents that match the personal preference is changed, the linking-icon library is again queried for refreshing the corresponding location-based content-linking icon marked on the corresponding geographic location.

2. The method according to claim 1, wherein the graphical user interface is a map interface initiated by a software program executed in a user device, and the one or more location-based content-linking icons are marked on the map interface.

3. The method according to claim 2, wherein an annotation with respect to each of the one or more location-based contents is tagged at a side of a corresponding one of the location-based content-linking icons that is marked on the map interface.

4. The method according to claim 3, wherein the location-based contents further comprise location-based audiovisual contents and location-based live contents.

5. The method according to claim 1, wherein, when the content category corresponds to more than one of the location-based content-linking icons, one of the location-based content-linking icons is randomly selected to be marked on the graphical user interface.

6. The method according to claim 1, wherein determining the content category of the one or more location-based contents includes the steps of:
   analyzing contents of the one or more location-based contents;
   determining one or more keywords and semantics of a title and the content of each of the location-based contents; and
   looking up a lookup table or using a semantic artificial-intelligence method according to the one or more keywords and semantics for obtaining the content category of the one or more location-based contents.

7. A system for providing a location-based content-linking icon, comprising:
   a computer-implemented server having a database and a linking-icon library;
   wherein a method of the server for providing the location-based content-linking icon comprises:
   in response to a location data received from a user device via a network, querying, according to coordinates of a geographic range corresponding to the location data generated via a graphical user interface initiated by a software program executed in a user device, the database to obtain one or more location-based contents that match a personal preference and are correlated with at least one geographic location within the geographic range;
   querying, according to a content category of each of the location-based contents, the linking-icon library that records one or more location-based content-linking icons corresponding one or more content categories to obtain the one or more location-based content-linking icons that are configured to be marked at the at least one geographic location on the graphical user interface; and
   entering a topic-discussion page in response to clicking on any of the one or more location-based content-linking icons that are configured to link to one or more location-based discussion topics; wherein, on the topic-discussion page, multiple topic-discussion areas formed from the one or more location-based discussion topics are displayed in a first direction and sorted by popularity, and multiple location-related discussion-topic categories that match the personal preference are displayed in a second direction;

wherein the one or more location-based contents obtained from the database are categorized into one or more content categories; when the content category of any of the location-based contents that match the personal preference is changed, the linking-icon library is queried for refreshing the corresponding location-based content-linking icon marked on the corresponding geographic location.

8. The system according to claim 7, wherein the graphical user interface is a map interface, and the one or more location-based content-linking icons are marked on the map interface.

9. The system according to claim 7, wherein the location-based contents further comprise location-based audiovisual contents and location-based live contents.

10. A non-transitory computer-readable recording medium, characterized in that the non-transitory computer-readable recording medium stores computer instructions that are performed to connect with a server of a system for providing a location-based content-linking icon, to load contents from the server, and to initiate a graphical user interface, wherein the computer instructions are executed in a user device for performing steps of:

generating a location data when the graphical user interface is initiated in the user device, and transmitting the location data to the server, so as to determine a geographic range according to the location data;

receiving, from the server, the one or more location-based content-linking icons that match a personal preference for at least one geographic location within the geographic range, so that the one or more location-based content-linking icons that are configured to link the one or more location-based discussion topics, are marked on the graphical user interface according to the at least one geographic location; and entering a topic-discussion page in response to clicking on any of the one or more location-based content-linking icons; wherein, on the topic-discussion page, multiple topic-discussion areas formed from the one or more location-based discussion topics are displayed in a first direction and sorted by popularity, and multiple location-related discussion-topic categories that match the personal preference are displayed in a second direction;

wherein, in the server, a database is queried according to coordinates of the geographic range for obtaining one or more location-based contents correlated with the at least one geographic location within the geographic range, and a linking-icon library that records the one or more location-based content-linking icons corresponding one or more content categories is queried according to a content category of each of the location-based contents for obtaining the one or more location-based content-linking icons that are configured to be marked at the at least one geographic location on the graphical user interface;

wherein the one or more location-based contents obtained from the database are categorized into one or more content categories; when the content category of any of the location-based contents that match the personal preference is changed, the linking-icon library is queried for refreshing the corresponding location-based content-linking icon marked on the corresponding geographic location.

11. The non-transitory computer-readable recording medium according to claim 10, wherein the graphical user interface is a map interface initiated by a software program executed in the user device, and after the computer instructions are executed, the one or more location-based content-linking icons are marked on the map interface.

12. The non-transitory computer-readable recording medium according to claim 10, wherein the location-based contents comprise location-based audiovisual contents and location-based live contents.

13. The non-transitory computer-readable recording medium according to claim 10, wherein, by the computer instructions executed in the user device, the graphical user interface is provided for a user to browse the one or more topic-discussion areas that are sorted by popularity with a vertical swipe gesture in the first direction, and to browse the multiple discussion-topic categories with a horizontal swipe gesture in the second direction.

* * * * *